United States Patent
Mann et al.

(10) Patent No.: US 12,531,474 B2
(45) Date of Patent: Jan. 20, 2026

(54) EFFICIENT INSTALLATION AND CONFIGURATION OF VOLTAGE CONVERSION SYSTEMS

(71) Applicant: Outdoor Wireless Networks LLC, Claremont, NC (US)

(72) Inventors: Charles John Mann, Omaha, NE (US); Steven Rogers, Hickory, NC (US); David Winkler, Alexandria, VA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 303 days.

(21) Appl. No.: 18/548,299

(22) PCT Filed: Feb. 25, 2022

(86) PCT No.: PCT/US2022/017905
§ 371 (c)(1),
(2) Date: Aug. 29, 2023

(87) PCT Pub. No.: WO2022/187095
PCT Pub. Date: Sep. 9, 2022

(65) Prior Publication Data
US 2024/0162800 A1 May 16, 2024

Related U.S. Application Data

(60) Provisional application No. 63/223,746, filed on Jul. 20, 2021, provisional application No. 63/157,325, filed on Mar. 5, 2021.

(51) Int. Cl.
*H02M 1/32* (2007.01)

(52) U.S. Cl.
CPC ..................... *H02M 1/32* (2013.01)

(58) Field of Classification Search
CPC .......... H02M 1/32; H02M 1/007; H02H 3/38; H02H 3/08; H02H 3/20; G05F 1/62
See application file for complete search history.

(56) References Cited

U.S. PATENT DOCUMENTS

| 9,231,399 B2 | 1/2016 | Kostakis et al. |
| 2015/0234405 A1* | 8/2015 | Chamberlain ........ H04W 52/00 455/572 |

(Continued)

FOREIGN PATENT DOCUMENTS

| KR | 20190086163 A | 7/2019 |
| WO | 2018025946 A1 | 2/2018 |
| WO | 2022187095 A1 | 9/2022 |

OTHER PUBLICATIONS

Commscope, "Powershift-V2 Manual Resistance Installation Instructions", Bulletin # 7830547, Rev. C, Jun. 20, 2019, pp. 1 through 40.
(Continued)

*Primary Examiner* — Alex Torres-Rivera
(74) *Attorney, Agent, or Firm* — Fogg & Powers LLC

(57) ABSTRACT

A voltage conversion system includes user interface circuitry disposed on the voltage conversion system. The user interface circuitry is configured to input at least one electrical parameter based on user input. At least one parameter of the at least one electrical parameter comprises a plurality of adjustable values and corresponds to a conductor resistance of electrical conductors coupled to the voltage conversion system. Each adjustable value of the at least one parameter corresponds to a range of two or more values. The voltage conversion system includes conversion circuitry configured to generate an adjusted direct current (DC) voltage from an input DC voltage based on the at least one electrical parameter.

20 Claims, 7 Drawing Sheets

(56) References Cited

U.S. PATENT DOCUMENTS

2016/0241148 A1* 8/2016 Kizilyalli .......... H02M 3/33523
2018/0131440 A1   5/2018 Patel et al.
2018/0213091 A1* 7/2018 Kostakis ................ G05F 1/468
2019/0165568 A1* 5/2019 Adamski ................ H02H 9/001
2019/0391192 A1* 12/2019 Winkler ............ H04W 52/0274
2020/0348708 A1  11/2020 Guerin et al.

OTHER PUBLICATIONS

International Searching Authority, "International Search Report and Written Opinion", from PCT Application No. PCT/US2022/017905, Jun. 17, 2022, pp. 1 through 12, Published in: WO.

* cited by examiner

EFFICIENT INSTALLATION AND CONFIGURATION OF VOLTAGE CONVERSION SYSTEMS

CROSS-REFERENCE TO RELATED APPLICATIONS

The present application claims priority to International Patent Application No. PCT/US2022/017905, filed on Feb. 25, 2022, titled "EFFICIENT INSTALLATION AND CONFIGURATION OF VOLTAGE CONVERSION SYSTEMS", which claims the benefit of U.S. Patent Application Ser. No. 63/157,325, filed Mar. 5, 2021, titled "TECHNIQUES TO MORE EFFICIENTLY INSTALL AND CONFIGURE POWER MANAGEMENT EQUIPMENT", and U.S. Patent Application Ser. No. 63/223,746, filed Jul. 20, 2021, titled "EFFICIENT INSTALLATION AND CONFIGURATION OF VOLTAGE CONVERSION SYSTEMS"; the entire contents of the aforementioned patent applications are incorporated herein by reference as if set forth in their entirety.

BACKGROUND

Modern radio communications systems enable communications over radio frequency (RF) between one or more terminal devices (such as phones, laptops, tablets, and the like) in a coverage zone. One example of a radio communications system is a cellular communication system, which includes a cellular base station comprising a baseband unit (BBU) communicatively coupled to one or more radios. The radio(s) communicate radio frequency (RF) signals to and from one or more antennas communicatively coupled to the radios, while the baseband unit processes both downlink signals from a backhaul communications system and uplink signals from the radio(s) for communicating with the terminal devices utilizing the communications system.

Sometimes the baseband unit and the radio(s) are separated over long distances. For example, the baseband unit may be located at the base of a cell tower while the radio(s) are distributed at the top of the cell tower hundreds of feet away from the baseband unit. To regulate the power given to the radio(s), a power supply may be used to provide sufficient voltage to the radio(s) so that the radio(s) can remain operable. Along with the baseband unit, the power supply and optionally other electronics used to operate the communications system reside at the bottom of the cell tower.

But installing the necessary electronics to deploy the communications system can prove to be a tricky endeavor. Oftentimes, the powering equipment and other electronics are installed as part of a distribution network that includes wiring many electrical connections. Additionally, installing the equipment requires knowing to a substantial degree of accuracy the parameters (current and voltage, for example) necessary to properly install and operate the equipment. At best, modern installation techniques introduce unnecessary and costly delays in deploying the communications system, for example, by having to hard-wire (and re-wire) input and output connections to dozens of discrete dedicated components in the equipment assembly or to input the correct parameters. Additionally, modern techniques may also increase the likelihood of installation errors, which can lead to sub-optimal system performance or damage to system components.

Therefore, a need exists to ease the installation process for deploying power management equipment in communications systems.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a voltage conversion system is provided. The voltage conversion system comprises overcurrent protection circuitry configured to receive a direct current (DC) power signal having a DC voltage and configured to protect the voltage conversion system from a current flowing through the voltage conversion system from exceeding a safe operating level. The overcurrent protection circuitry is configured to provide an input DC voltage based on the received DC voltage. The voltage conversion system further comprises user interface circuitry disposed on the voltage conversion system. The user interface circuitry is configured to input at least one electrical parameter based on user input. At least one parameter of the at least one electrical parameter comprises a plurality of adjustable values and corresponds to a conductor resistance. Each adjustable value of the at least one parameter corresponds to a range of two or more values. The voltage conversion system further comprises conversion circuitry coupled to the overcurrent protection circuitry and the user interface circuitry. The conversion circuitry is configured to generate an adjusted DC voltage from the input DC voltage based on the at least one electrical parameter. The voltage conversion system further comprises overvoltage protection circuitry electrically coupled to the conversion circuitry. The overvoltage protection circuitry is configured to provide the adjusted DC voltage to electrical conductors electrically coupled to the voltage conversion system.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout the figures and text.

DETAILED DESCRIPTION

Figure 1:
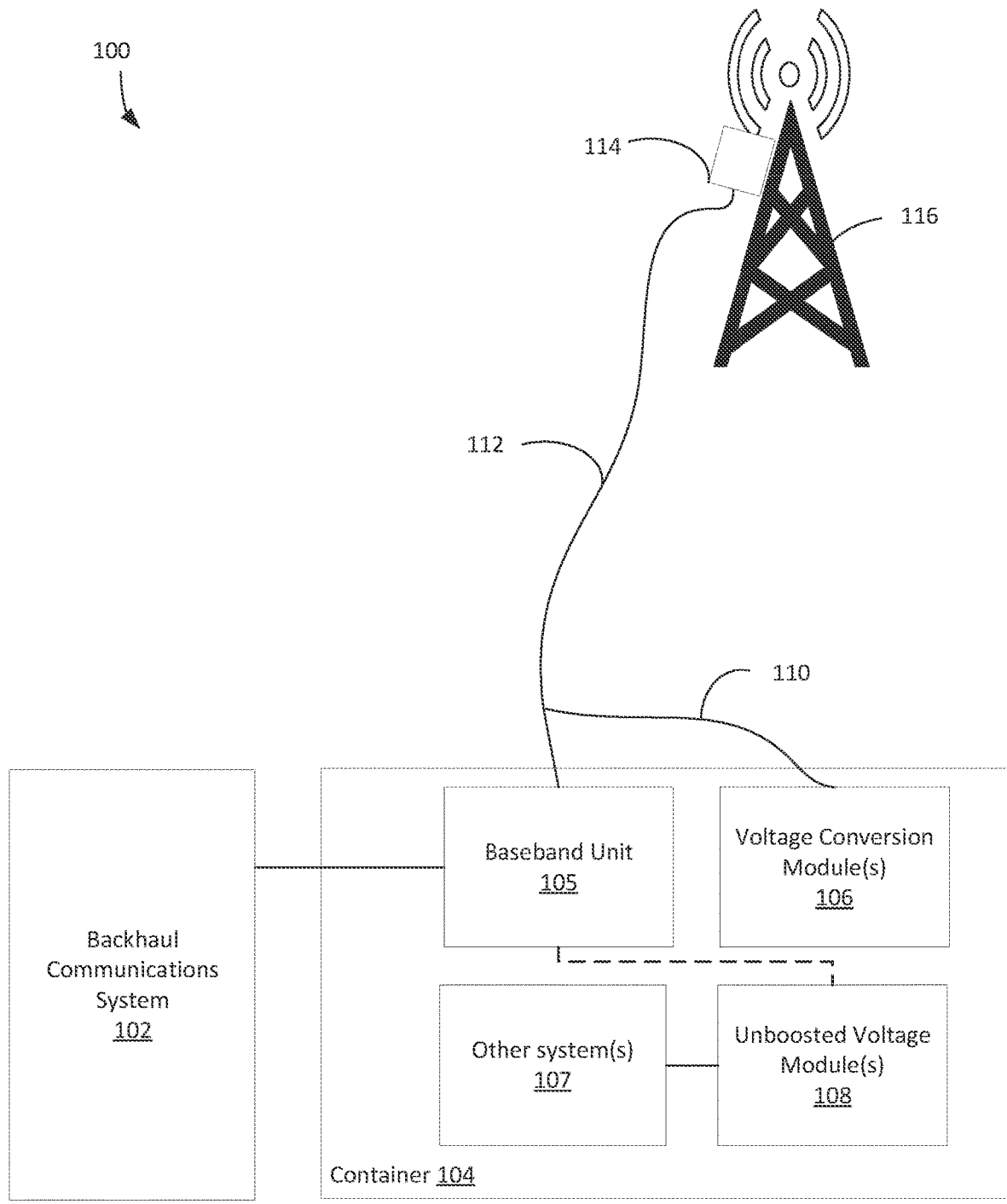
FIG. 1 depicts a block diagram illustrating one embodiment of a radio communications system according to the teachings of the present disclosure.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The present disclosure describes improvements to installation and operation of powering equipment in a radio communications system. Such improvements can be implemented in a cellular communications system comprising a baseband unit (BBU) communicating with a remote radio head (RRH) remotely located, for example, at the top of a cellular tower, but can be implemented through other radio communication systems as well. These radio systems can include distributed antenna systems (DAS), radio access networks (RAN), and the like.

As described above, radio communication systems can benefit from deploying power management equipment that provides regulated power to the remotely located radio, but deploying such equipment can be lengthy and complex to install and maintain. The present disclosure describes a power management system designed for simple installation and reconfiguration. Instead of installing dedicated electronics (power supplies, circuit breakers, conversion circuitry, processing circuitry, for example) discretely, which may involve numerous hard-wire connections, the electronics can be integrated into a module that can be easily connected and disconnected to electrical conductors configured to provide power to one or more radios. Several modules, each with distinct functionality, can be mounted in a container that is partitioned into a plurality of slots by inserting each module in one of the slots. Installing modules with integrated functionality in a compact container requires fewer electrical connections than installing dedicated powering equipment, and enables simpler reconfiguration when power conversion electronics need to be replaced, or when the power needs of the radio communication system have to be modified. In addition, housing multiple conversion modules in a compact container reduces the space needed to deploy power management equipment in a radio communication system so that the remaining space can be used more efficiently and can reduce cost and increase reliability as a result of reducing wiring to be installed by personnel.

Additionally, embodiments of the voltage conversion modules improve installation of the power management equipment through user interface circuitry that enables direct configuration of the voltage conversion module. The user interface circuitry enables a technician or operator to adjust the output voltage of the module based on at least one parameter corresponding to a resistance of the conductors even when the technician or operator does not know the exact values necessary to install the power management equipment.

Embodiments of the disclosure will now be described with reference to the accompanying drawings.

FIG. 1 depicts a block diagram illustrating one embodiment of a radio communications system 100. System 100 includes a backhaul communications system 102 configured to transmit downlink signals to baseband unit 105. The baseband unit 105 processes the downlink signals and transmits the processed signals to one or more radios 114 (e.g., a remote radio head (RRH)) communicatively coupled to baseband unit 105, where the radio(s) 114 can communicate radio frequency (RF) signals to terminal devices. In the uplink direction, radio(s) 114 receives RF signals, demodulates the RF signals, and provides the demodulated signals to baseband unit 105 via one or more cables 112. The baseband unit 105 processes the demodulated signals received from radio(s) 114 and forwards the processed signals to backhaul communications system 102. Baseband unit 105 and radio(s) 114 can include optical-to-electrical and electrical-to-optical converters that couple the signals transmitted to and from the one or more cables 112.

Baseband unit 105 can be communicatively coupled to radio(s) 114 through one or more cables 112. The one or more cables 112 can include a fiber optic cable or other communication medium to couple baseband unit 105 to radio(s) 114. Radio(s) 114 can be positioned at or near the top of cell tower 116, though other mounting structures can be used. The one or more cables 112 can also include a power cable that communicatively couples electrical conductors 110 to electrical conductors at or near radio(s) 114 at the other end of the power cable. In some embodiments, the one or more cables 112 can be implemented as a single cable which both couples the data communication connectivity (e.g., a fiber optic cable) between baseband unit 105 and radio(s) 114 as well as the power connectivity (e.g., a power cable) between electrical conductors 110 to radio(s) 114. However, separate cables 112 can be used for each different pathway. Additionally, although not explicitly shown in FIG. 1, baseband unit 105 and/or electrical conductors 110 may couple to multiple radios 114.

Baseband unit 105 can be enclosed in a container 104 along with one or more voltage conversion module(s) 106 (alternatively referred to as "voltage conversion system") and one or more unboosted voltage module(s) 108. Voltage conversion module(s) 106 are configured to provide DC voltage to electrical conductors 110 which connect voltage conversion module(s) 106 to one or more cables 112 and ultimately to radio(s) 114. Voltage conversion module(s) 106 can include any number of static voltage conversion modules, dynamic voltage conversion modules, or any such combination thereof. Static voltage conversion modules are configured to provide a fixed DC voltage boost to radio(s) 114. Dynamic voltage conversion modules are configured to provide a DC voltage boost that varies based on the resistance of the electrical conductors 110 and/or one or more cables 112, as well as the measured current flowing from the electrical conductors 110 and/or one or more cables 112. When delivering power to radio(s) 114 through one or more cables 112, the resistance of the power cable can cause a voltage drop proportional to the current drawn through the cable, and a dissipative power loss in the cable proportional to the square of the current flowing through the cable. The DC voltage provided by voltage conversion module(s) 106 can be used to reduce the power loss attributable from one or more cables 112 or other medium used to deliver power to radio(s) 114.

Container 104 further includes one or more unboosted voltage module(s) 108 coupled to one or more other system(s) 107 and, in some embodiments, electrical conductors 110. Unboosted voltage module(s) 108 can provide an unboosted DC voltage to other system(s) 107 that require power in the radio communications system 100. These other systems 107 can include cooling equipment, lighting equipment (e.g., to provide lighting to container 104), environmental sensors and/or circuitry to monitor the internal and/or external environment of container 104 (e.g., to activate battery heaters in cold temperatures), redundant power systems (e.g., batteries and/or other power sources), network equipment used for front-haul, mid-haul, and back-haul communications, and other equipment used for the deployment of radio communications system 100. Optionally, unboosted voltage module(s) 108 can provide DC power to baseband unit 105.

As described in further detail below, container 104 and/or the voltage conversion module(s) 108 can include user interface circuitry configured to input at least one electrical parameter used to determine an output DC voltage to provide to radio(s) 114 through output conductors 110. In some embodiments, the at least one electrical parameter corresponds to a resistance of electrical conductors 110 and can be input as a range of values. In doing so, the voltage conversion module(s) 106 can provide a suitable DC voltage to the radio(s) 114 even when the technician does not know the correct parameters necessary to install or modify the equipment in container 104 to a substantial degree of accuracy, which simplifies the installation process of installing equipment in container 104.

Figure 2:
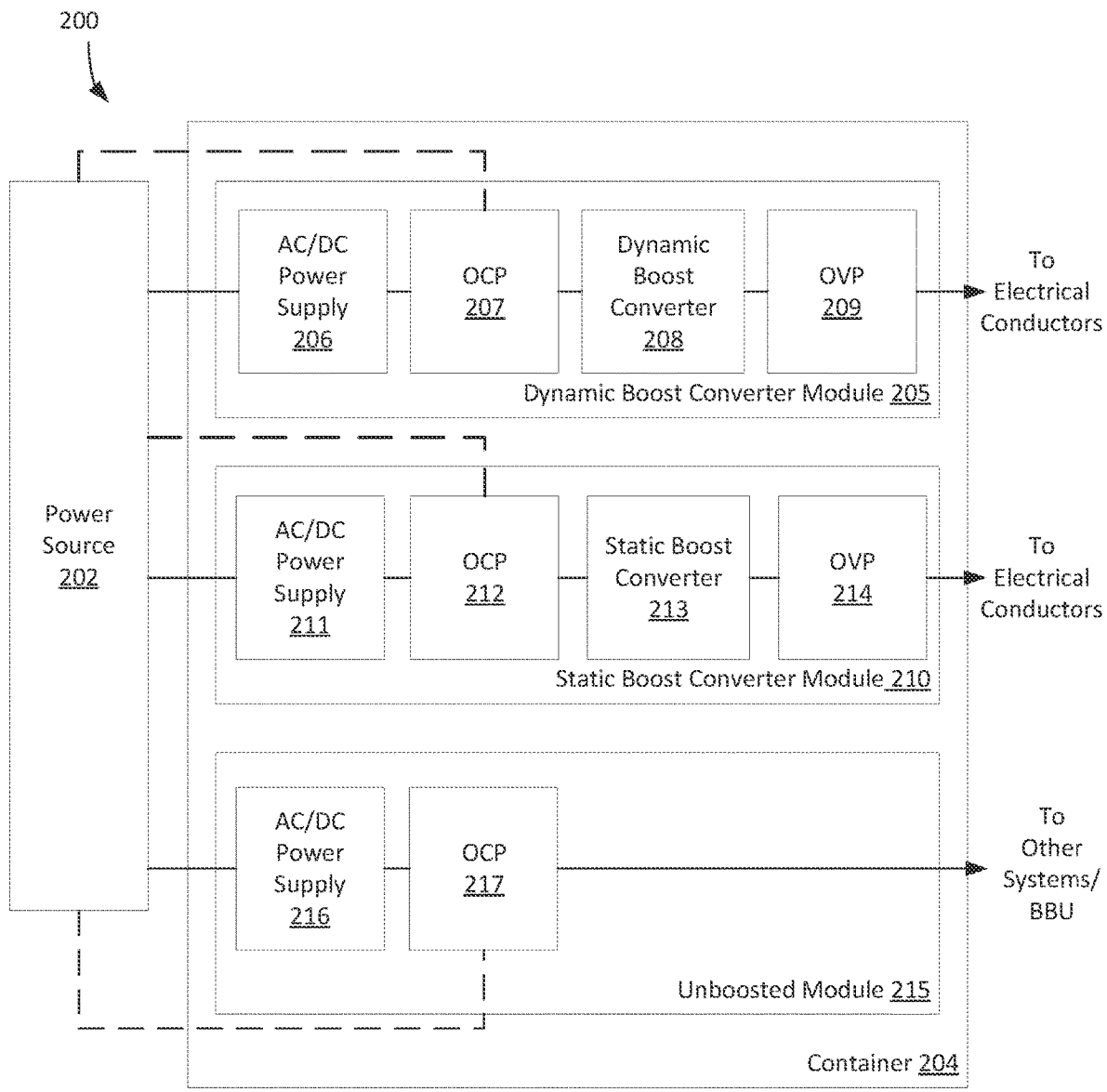
FIG. 2 depicts a block diagram illustrating one embodiment of a system configured to provide direct current (DC) voltage to electrical conductors according to the teachings of the present disclosure.

FIG. 2 depicts a block diagram illustrating one embodiment of a system configured to provide DC voltage to electrical conductors electrically coupled to at least one radio. System 200 can be implemented, for example, at the base of a cell tower as shown in FIG. 1. System 200 generally is configured to provide DC voltage to a receiving load. For example, one or more radios (not shown in FIG. 2) can be located remotely from system 200 (e.g., at the top of the cell tower) and electrically coupled to system 200 by the electrical conductors. In some embodiments, the electrical conductors are electrically coupled to a power cable that connects system 200 to the radio(s) at the top of the cell tower. In some embodiments, more than one set of electrical conductors is connected to dynamic boost converter module 205 and static boost converter module 210. And as noted with respect to FIG. 1 above, dynamic boost converter module 205 may couple to different radios than static boost converter module 210, or both dynamic boost converter module 205 and static boost converter module 210 may couple to one or more of the same radios.

System 200 includes a power source 202 configured to provide voltage for one or more modules that are installed in the container 204. In some embodiments, power source 202 is an alternating current (AC) power supply configured to generate an AC voltage and supply the AC voltage to an alternating current-direct current (AC/DC) power supply of each module. In other embodiments power source 202 includes at least one battery configured to provide a DC voltage to overcurrent protection circuitry of each module.

One or more voltage conversion modules are electrically coupled to power source 202 and configured to receive at least one of the AC voltage or DC voltage. Each module can include various circuitry integrated as a single unit configured to convert the received AC and/or DC voltage from power source 202 to an adjusted DC voltage output. Focusing on dynamic boost converter module 205, AC/DC power supply 206 is configured to receive an AC voltage from power source 202 when power source 202 supplies an AC voltage. AC/DC power supply 206 is then configured to generate a DC voltage from the corresponding AC voltage and provide the DC voltage to overcurrent protection circuitry (OCP) 207. However, AC/DC power supply 206 is optional because when power source 202 is providing DC voltage, the DC voltage is provided directly to OCP 207. Accordingly, in some embodiments, dynamic boost converter module 205 includes only OCP 207, dynamic boost converter 208, and overvoltage protection circuitry (OVP) 209.

OCP 207 is configured to receive DC voltage from at least one of power source 202 and AC/DC power supply 206. OCP 207 can receive DC voltage directly from power source 202 when power source 202 is operating on DC battery power, and/or can receive DC voltage from AC/DC power supply 206. OCP 207 is configured to monitor current flowing through the electrical pathways between the input current (from power source 202 and/or AC/DC power supply 206) and dynamic boost converter 208. When an electrical fault is detected (e.g., a current level above a threshold value, which can be set based on a safe operating parameter for dynamic boost converter module 205), OCP 207 is configured to protect dynamic boost converter module 205 from dangerous current levels, for example, by shunting the electrical path and prevent current flow until the current reaches safe operating levels. In some embodiments, OCP 207 can include any one or combination of switches, circuit breaker(s), and other circuitry. Optionally, OCP 207 can include an analog or digital controller.

Dynamic boost converter module 205 further includes dynamic boost converter 208. Dynamic boost converter 208 includes conversion circuitry configured to receive the DC voltage from OCP 207 and convert the DC voltage to an adjusted DC voltage output. The adjusted DC voltage is not set statically but is instead determined based on one or more operating parameters of system 200. In some embodiments, the one or more operating parameters include a target DC voltage to be received by the radio(s) (e.g., the electrical conductors at the radio end of the power cable opposite to the electrical conductors coupled to the converter modules) and at least one parameter corresponding to the resistance of the electrical conductors coupling the radio(s) to dynamic boost converter module 205. Dynamic boost converter 208 may be configured to determine the resistance of the electrical conductors exactly or to a substantial degree of accuracy, for example, through resistance measurement circuitry. Alternatively, conductor resistance can be determined through data received by user input, such as the length of the cable, conductor gauge, conductor diameter, and the like. As described in further detail in FIGS. 3-6, these parameters may be determined through user input, which configures dynamic boost converter 208 to convert the received DC voltage based on the one or more parameters, which can be selected based on user input.

Additionally, dynamic boost converter module 205 optionally includes overvoltage protection circuitry (OVP) 209 electrically coupled to dynamic boost converter 208. OVP 209 is configured to monitor the voltage at the electrical conductors. If critical voltage levels are detected, for example, voltage levels that exceed a threshold level (e.g., a safe operating voltage of the radio(s) coupled downstream of the electrical conductors and/or a safe operating voltage of dynamic boost converter module 205), OVP 209 can prevent voltage from being received to the electrical conductors. The safe operating voltage can be a voltage less than 60 VDC. In some embodiments, OVP 209 is configured to protect dynamic boost converter 205 from damage caused by excess voltage levels (e.g., transient power surges from lightning strikes). In some embodiments, OVP can also be electrically coupled to the radio(s) at the top of the cell tower.

In the embodiment shown in FIG. 2, system 200 also includes static boost converter module 210 electrically coupled to power source 202. Static boost converter module 210 can include (but not limited to): optional AC/DC power supply 211, OCP 212, static boost converter 213, and OVP 214. AC/DC power supply 211, OCP 212, and OVP 214 function similarly to AC/DC power supply 206, OCP 207, and OVP 209, respectively. Unlike dynamic boost converter 208, however, static boost converter 213 is configured to convert the received DC voltage from OCP 212 to a fixed value that is not dynamically adjusted. In some embodiments, the DC voltage can be adjusted based on user input, through user interface circuitry that modifies (e.g., boosts) the DC voltage by an amount that corresponds with a user-selected value input via the user interface.

System 200 may also include unboosted module 215 electrically coupled to power source 202. Unboosted module 215 may include (but not limited to) AC/DC power supply 216 and OCP 217. AC/DC power supply 216 and OCP 217 function similarly to AC/DC power supply 206/211 and OCP 207/212. In some embodiments, unboosted module 215 outputs an unboosted DC voltage to electrical conductors, which can be the DC voltage level from AC/DC power supply 216 or the DC voltage level from power source 202 if power source 202 is providing a DC voltage (e.g., if power source 202 includes at least one battery). In some embodiments, unboosted module 215 outputs a fixed voltage output that can vary within a tolerance range (e.g., between 48 VDC to 57 VDC) based on the function of the input DC voltage and the load.

Each of the modules as described above are attached to and/or coupled within a container 204. In some embodiments, container 204 includes a plurality of racks upon which one or more modules can be mounted on. In some embodiments, each rack includes one or more slots that correspond to the dimensions of a module so that the module can be inserted into one of the slots (see FIG. 3). While system 200 illustrates a total of three modules housed in container 204, any number of modules can be housed within container 204. Additionally, FIG. 2 shows particular examples of modules housed in container 204 only for pedagogical explanation, and that any particular arrangement of modules can be placed in container 204 depending on the requirements of the radio system. For example, container 204 can include only dynamic boost converter module(s) 205, static boost converter module(s) 210, or unboosted module(s) 215, or any combination of any number of modules described above.

Container 204 can, in some embodiments, be configured so that the slots and racks correspond to a designated module. For example, one rack in container 204 comprises slots that can be configured to engage only with dynamic boost converter modules 205, another rack comprising slots engaged for static boost converter modules 210, and yet another rack comprising slots for unboosted modules 215. In other embodiments, the racks and/or slots are configured to engage with any of the modules described above.

Figure 3:
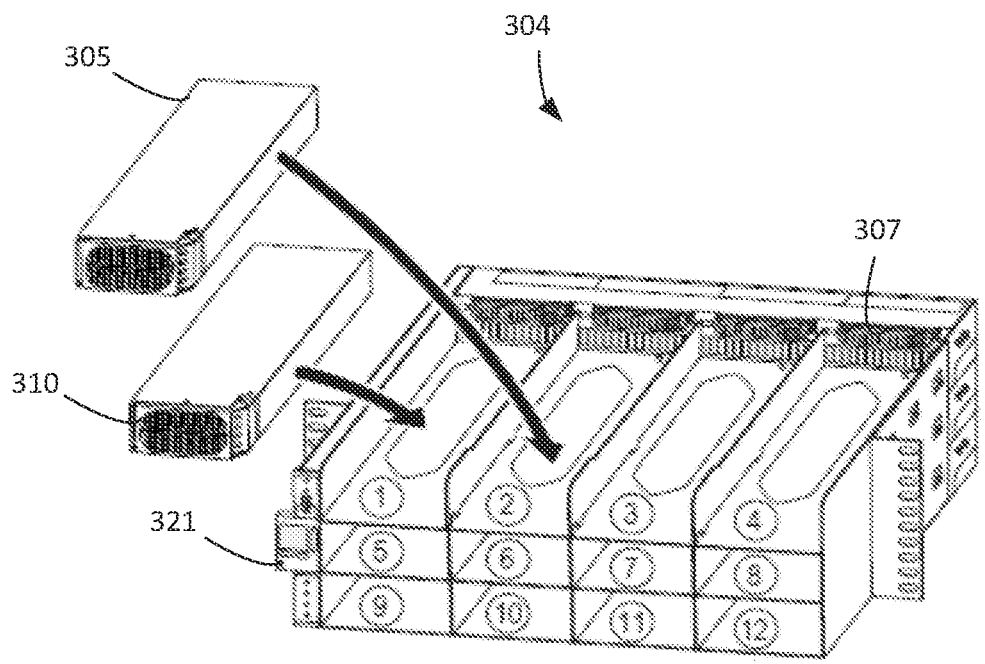
FIG. 3 depicts a structural diagram illustrating one embodiment of a container configured to house voltage conversion modules according to the teachings of the present disclosure.

FIG. 3 depicts a structural diagram illustrating one embodiment of a container configured to house voltage conversion modules. Container 304 is in one embodiment identical to container 204 as described above with respect to FIG. 2.

Container 304 includes a body having a right side, a left side, a back side (not shown in FIG. 3), and a front side. Container 304 further includes a plurality of racks each comprising four slots arranged vertically between the right side and the left side. As shown in FIG. 3, container 304 includes a first rack comprising slot 1, slot 2, slot 3, and slot 4; a second rack below the first rack comprising slot 5, slot 6, slot 7, and slot 8; and a third rack below the second and first racks comprising slot 9, slot 10, slot 11, and slot 12. More and fewer racks can be included in container 304, and each rack can have more or fewer slots per rack than as shown in FIG. 3.

Each voltage conversion module, such as voltage conversion modules 305 and 310 shown in FIG. 3, can be inserted into one of the slots 1-12. Voltage conversion modules 305 and 310 may be identical, or they may be different. For example, voltage conversion module 305 may be a dynamic boost conversion module, and voltage conversion module 310 may be a static boost conversion module. A module can be coupled to a slot in container 304 by placing the module on a slot. The back of container 304 includes connection region 307 that is configured to engage with one side of the inserted voltage conversion module, though in some embodiments connection region 307 can be located in the front of container 304, in which case conversion modules 305 and 310 can be inserted from the back of container 304. Connection region 307 can include input and output ports, electrical connections, and/or circuitry that can compatibly engage with one or more input or output ports, electronic connections, and/or circuitry on the voltage conversion module. Connection region 307 can also include input and output ports, electrical connections, and/or circuitry for the conveyance of analog signaling and/or digital communication between conversion modules 305 and 310, and/or between a conversion module and controller 321. Once engaged, the module becomes electrically coupled to the connection region 307 and enables current to flow from the module to electrical conductors electrically coupled to the connection region 307. In some embodiments, a voltage conversion module can be inserted into a slot by sliding the module through an opening on the front side of container 304 until the voltage conversion module engages with connection region 307.

As described above, in some embodiments the slots in each rack are configured to engage with any type of voltage conversion module, so that any available slot can be used to insert a module. When an inserted module needs to be replaced or removed from container 304, the module can be de-engaged from connection region 307. In some embodiments, container 304 includes a controller 321 (controller circuitry 321) that provides system control of container 304. In some embodiments, controller 321 can be a Central Processing Unit (CPU) or Programmable Logic Controller (PLC) embedded in container 304. However, a separate controller 321 can also be disposed on each voltage conversion module, as described in further detail below. In some embodiments, controller 321 is electrically coupled to user interface circuitry and is configured to adjust the DC voltage provided by each module housed in the container 304. Controller 321 can also be configured to activate and deactivate selected modules.

Figure 4:
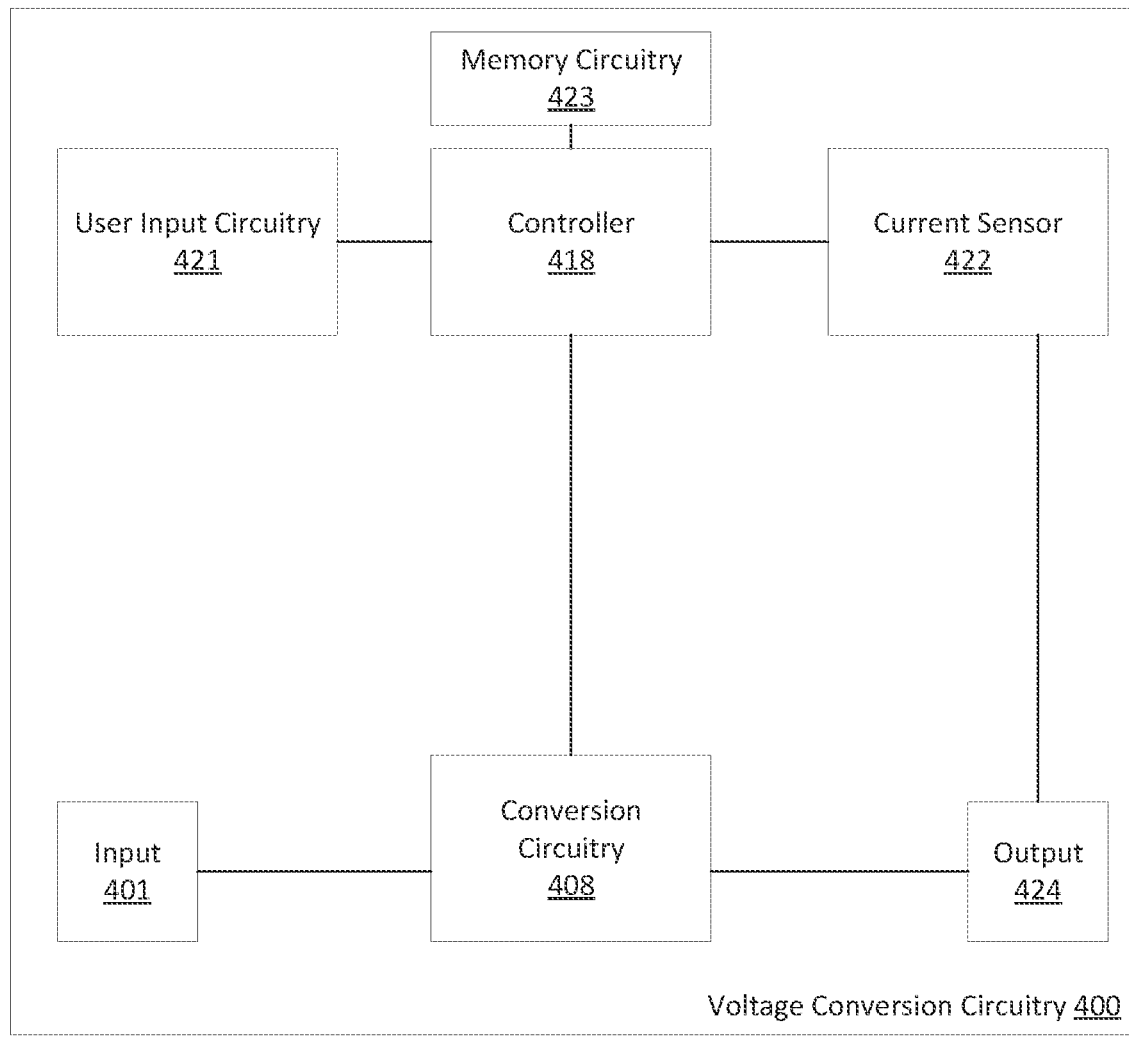
FIG. 4 depicts a block diagram illustrating one embodiment of voltage conversion circuitry implemented in a voltage conversion module according to the teachings of the present disclosure.

FIG. 4 depicts a block diagram illustrating one embodiment of voltage conversion circuitry implemented in a voltage conversion module. In one embodiment, voltage conversion circuitry 400 is an example of dynamic boost converter 208. Voltage conversion circuitry includes input (or input conductors) 401 configured to receive an input DC voltage (e.g., from OPC 207) and provides the DC voltage to one input of voltage conversion circuitry (or conversion circuitry) 408. Conversion circuitry 408 is then configured to convert the DC voltage from input 401 to an adjusted DC voltage, which is then provided to output (or output conductors) 424. The adjusted DC voltage is determined based on the control signals sent by controller (or controller circuitry) 418 to conversion circuitry 408, as described further below.

Voltage conversion circuitry 400 includes a user input circuitry 421 (implemented for example, via interface circuitry coupled to a user interface) where a user such as a technician or operator can input at least one parameter to controller 418. At least one of the parameters corresponds to a conductor resistance (for example, conductor resistance, conductor length, conductor gauge); however, the user may input other parameters as well. Voltage conversion circuitry 400 further includes current sensor 422 (alternatively, current measuring circuitry 422) coupled to output 424 (output conductors) and controller 418. Current sensor 422 is configured to measure a current parameter corresponding to current flowing through output 424. Current sensor 422 then sends the current measurements to controller 418.

Controller 418 receives the parameters from user input circuitry 421 and the current measurements from current sensor 422 and determines a DC voltage based on the current measurements and user input. For example, if the user inputs a conductor resistance at user input circuitry 421, controller 418 can be configured to calculate an adjusted DC voltage from the resistance value and the measured current using known relationships between voltage, current, and resistance. However, oftentimes the user may not know the actual value of conductor resistance, but may know other parameters of the conductor, such as the conductor length, gauge, and the like. In other situations, the user may not know the precise values of even these parameters (and may not be able to adequately determine these parameters), and so the user may need to approximate the parameter.

Accordingly, at least one of the parameters received by user input circuitry 421 comprises a range of values, in which each adjustable value corresponds to at least two different quantities. To put another way, the user can for at least one parameter input a range of values instead of selecting a single value to determine the conductor resistance. The selection of a range of values enables the user to approximate the required parameter to controller 418. For example, the user can input a conductor length of 50-100 feet, in which case controller 418 accesses a look-up table or other indicator of a conductor resistance corresponding to the selected range of conductor lengths in memory circuitry 423. In some embodiments, the user can input multiple parameters (via user input circuitry 421) to controller 418. For example, the user can input a conductor length between 100-200 feet, as well as a conductor gauge of 6-AWG or 16-mm², and/or a target voltage of 54 VDC. Controller 418 receives these parameters and determines the corresponding cable resistance values in memory circuitry 423 for each parameter. Controller 418 is the configured to determine a conductor resistance based on the conductor resistance values, and to configure conversion circuitry to output an adjusted DC voltage based on the conductor resistance.

Enabling conversion circuitry 408 to output an adjusted DC voltage based on a range of values simplifies the installation process for configuring voltage conversion modules in power management equipment. For example, the adjusted DC voltage can be modeled based on a linear relationship between voltage, current, and resistance as shown in the following equation:

$$y=mx+b$$

where y is the adjusted DC voltage, m is a resistance setpoint corresponding to the conductor resistance, x is the output current, and b is a threshold voltage that can be selected based on the operating conditions of the radio (such as the minimum operation voltage of the radio). When the user inputs one or more parameters corresponding to conductor resistance, controller 418 can determine the resistance setpoint, the measured current value, and a threshold voltage (stored in memory circuitry 423) to determine the resulting DC voltage output by conversion circuitry 408.

However, conversion circuitry 408 can output a suitable DC voltage even if the parameters input by the user are significantly different from the actual system configuration. For example, consider a system with a conductor length of 100 feet and a conductor gauge of 6-AWG. Instead of inputting a value of 100 feet and a 6-AWG gauge, the user can instead input a range of 50-200 feet. If the corresponding resistance value is 0.09 Ohms, then with a cable length of 100 feet the output voltage will be approximately constant over varying levels of current (in other words, a graph of voltage as a function of the load current will be represented as an approximately horizontal line). In the example described above, this would correspond to a voltage of approximately 54 VDC (with an operation threshold selected at 54 VDC), which is within the operating voltage range for many radios.

However, if the actual conductor length is not 100 feet but is instead 200 feet, then the resistance setpoint calculated by a 50-200 foot parameter may not exactly correspond to a 200 feet conductor length. In the example above where a setpoint of 0.09 Ohms is used, the output voltage to the radio will decrease as a function of the load current (a negative slope). However, the resistance setpoint is determined so that, even for very large load currents, a length in the given range will still generate a suitable output voltage for the radio. Using the 0.09 Ohm value above would still correspond to a DC voltage of over 51 Volts to the radio for a load current of 35 Amps, which is still within the operation voltage for conventional radios.

Even selecting a range that is outside the exact parameter can still provide a suitable DC voltage to the radio. For example, if the actual length of the conductor is 250 feet but the user inputs a conductor length between 50-200 feet, then using the resistance setpoint of 0.09 Ohms above, the output voltage will decrease as a function of load current more rapidly than with respect to a conductor length of 200 feet. Even so, the output voltage provided to the radio would be approximately 50 VDC, which is still within the operation voltage for conventional radios. Therefore, parameters can vary significantly from the physical state of the system and yet conversion circuitry 408 can be configured to provide an acceptable voltage to the radio. Such wide variance tolerance enables simplified power management equipment installation.

Figure 5:
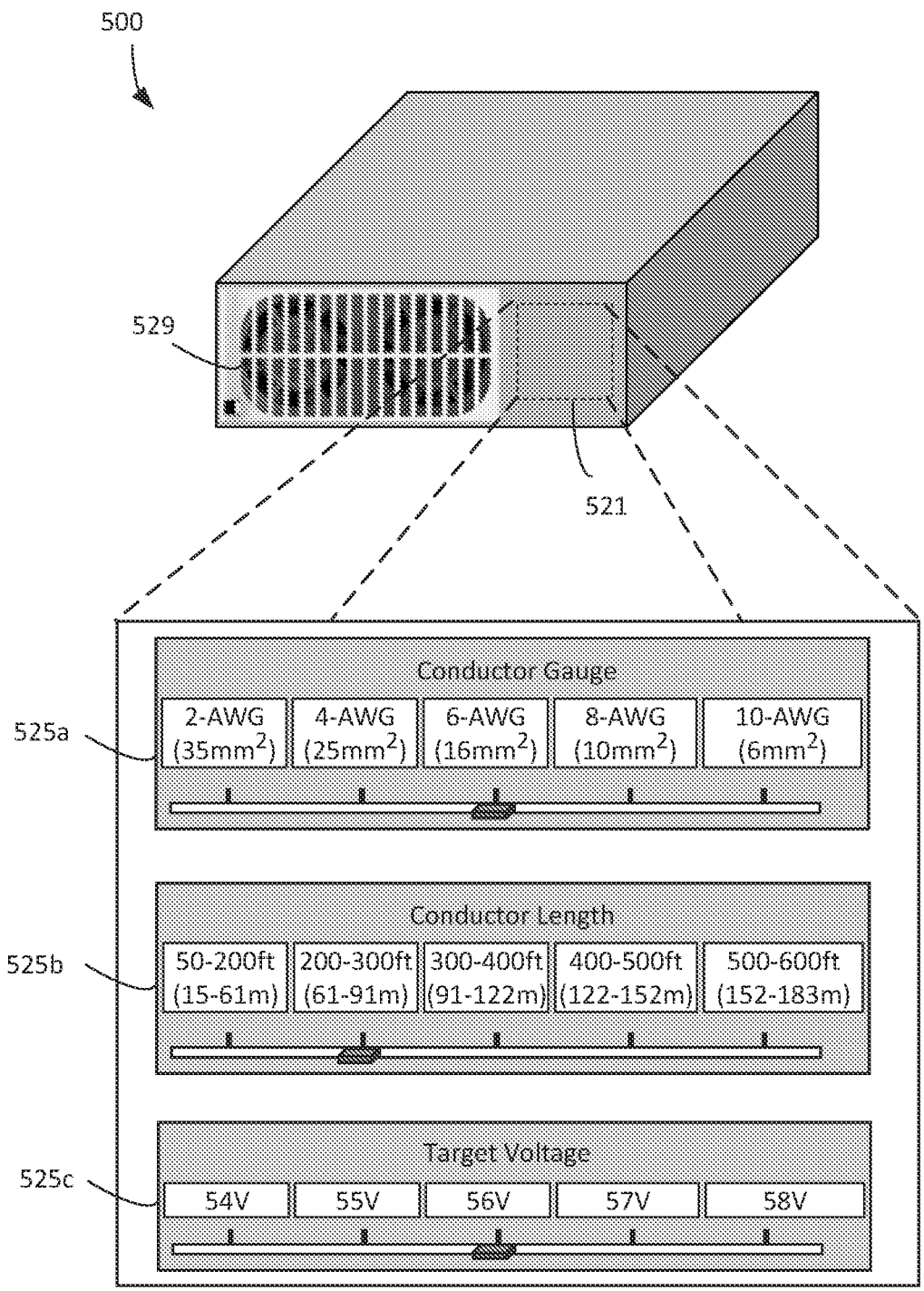
FIG. 5 depicts a structural diagram illustrating one embodiment of a voltage conversion module and a user interface disposed on the voltage conversion module according to the teachings of the present disclosure.

FIG. 5 depicts a structural diagram illustrating one embodiment of a voltage conversion module and user interface circuitry disposed on the voltage conversion module. For pedagogical explanation, user interface circuitry 521 is disposed on the back side of voltage conversion module 500 with the understanding that user interface circuitry 521 can be placed anywhere on voltage conversion module 500. In addition to user interface circuitry 521, voltage conversion module 500 includes cooling equipment 529 (e.g., a fan) to cool an environment of voltage conversion module 500 during operation.

FIG. 5 further illustrates a magnified perspective of an exemplary embodiment of the user interface circuitry 521, in which a technician or operator can adjust one or more parameters used to determine an appropriate DC voltage to provide to one or more radios electrically coupled to voltage conversion module 500 by electrical conductors. Three such parameters (conductor gauge 525a, conductor length 525b, and target voltage 525c) are shown in FIG. 5; however, more or fewer parameters may be used. When a technician needs to configure voltage conversion module 500, the technician can select a value for each of the parameters by moving the switch under each respective parameter to the desired value. For example, in FIG. 5, the user can select the conductor gauge as 6-AWG by moving the switch to be under the 6-AWG block, and may also select a conductor length of 200-300 feet and a target voltage of 56 VDC through the same technique. For parameters that are defined by a range of values (e.g., conductor length 525b), the user can select the range that most closely corresponds with the estimated conductor resistance. In this way, a technician can directly configure voltage conversion module 500 by interfacing with user interface circuitry 521 instead of configuring voltage conversion module 500 indirectly (e.g., via a laptop), which is typically required in installing equipment for radio communication systems.

While user interface circuitry 521 depicts a switch or a potentiometer as an input/output (I/O) device, other such devices may be used. In some embodiments, the switch can be replaced by knobs, dials, buttons, potentiometers, touch-screens, and the like. In some embodiments, only one I/O device is used that corresponds to each electrical parameter. Each I/O device is coupled to analog and/or digital electronic circuitry configured to generate signals that relate input from the user (e.g., by the user configuring the I/O device) into electrical signals that can be conveyed to processing circuitry (e.g., to controller 418 or other type of controller or processor).

Figure 6:
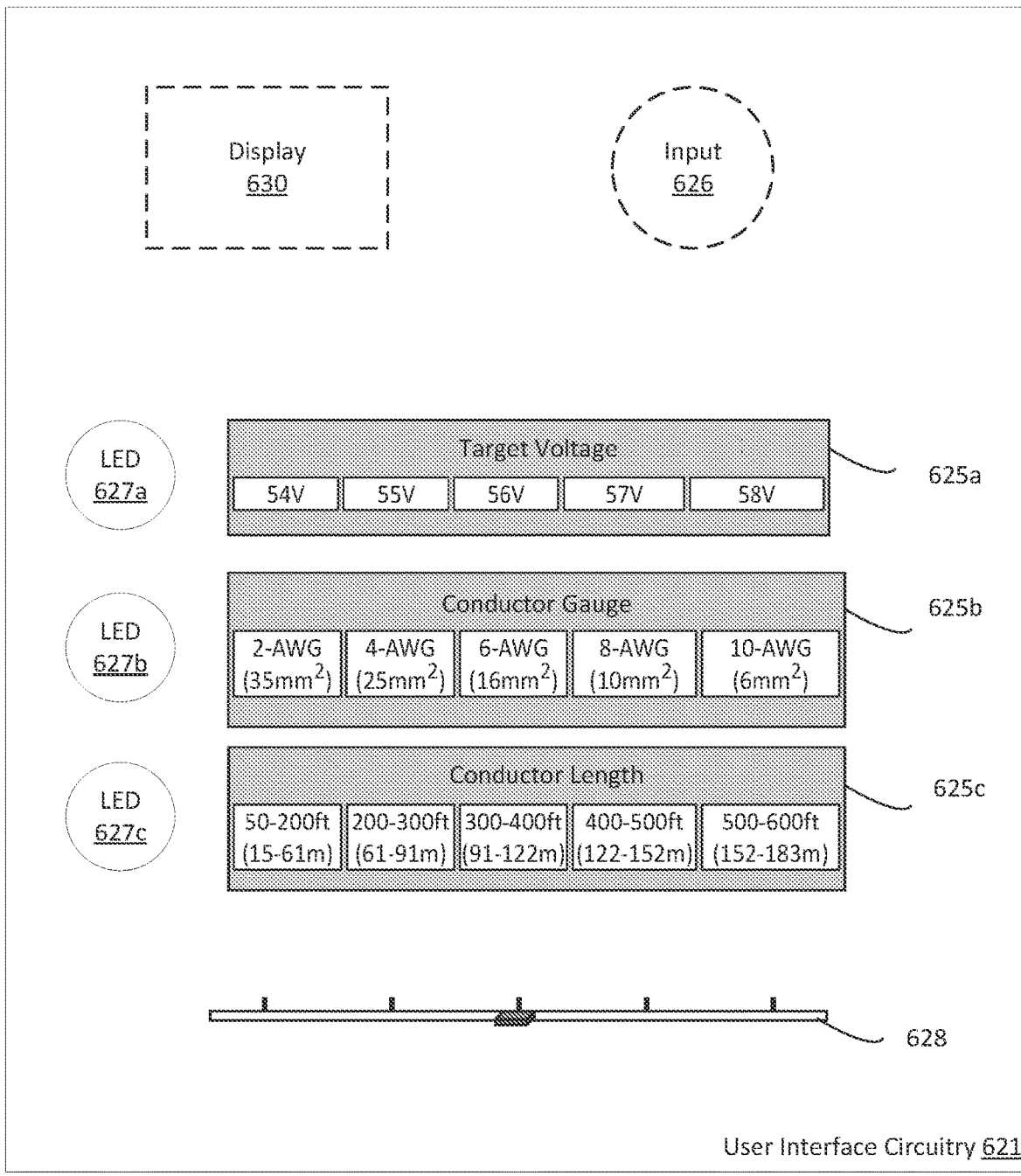
FIG. 6 depicts a block diagram illustrating one embodiment of a user interface according to the teachings of the present disclosure.

FIG. 6 depicts a block diagram illustrating another embodiment of user interface circuitry that may be disposed on a voltage conversion module or on a container that houses a plurality of voltage conversion modules. User interface circuitry 621 includes at least one parameter that is inputted by the user that is used to determine a conductor resistance. For example, the user may determine a conductor gauge 625b and/or a conductor length 625c. In some embodiments, at least one of the parameters are defined by a range of values, in which each adjustable value of the parameter corresponds to two or more quantities. In some embodiments, other parameters used to determine an output DC voltage to at least one radio are included, such as the target voltage 625a.

User interface circuitry 621 includes at least one switch 628 or other I/O device in which the user may select a desired parameter. User interface circuitry 621 optionally includes an input 626, which can be a button or other I/O device, so that when the user desires to configure the voltage conversion module, the user can press input 626 to begin the configuration process. In one embodiment, after the user presses input 626, light emitting diode (LED) 627a begins to indicate (e.g., light up or flash), thus indicating to the user to input the corresponding parameter (in FIG. 6, this would be target voltage 625a). The user can select the desired value for the voltage target by adjusting switch 628 to match the value directly underneath the desired value. As shown in FIG. 6, the target voltage would be set to 56 VDC. The user then presses input 626 to complete configuration for the respective parameter.

In embodiments where additional parameters are used, pressing input 626 results in another phase of configuration. For example, LED 627b may begin to flash or light up, thus indicating that the conductor gauge parameter is ready to be selected. The user may again adjust switch 628 to select the estimated conductor gauge and press input 626. The configuration process may repeat again after the user presses input 626, in which LED 627c lights up or flashes. In response, the user adjusts switch 628 to input the estimated conductor length, and press input 626 again to finalize configuration. Controller 418 receives each parameter and determines a corresponding conductor resistance based on the user selected parameters.

In some embodiments, multiple switches 628 are used that correspond to each parameter, such as the embodiments shown and described with respect to FIG. 5. Additionally, or alternatively, only one LED is used that corresponds to each parameter that can be input by the user. The LED may flash or light up as a different color when a different parameter is requested. For example, the user interface circuitry 621 can include a single LED 627a that corresponds to each of the three parameters 625a-c as shown in FIG. 6. To signal to the user to set the target voltage 625a, LED 627a can flash a blue color. Once the user sets the target voltage 625a, LED 627a then flashes a different color (red, for example) to signal to the user to set the conductor gauge parameter 625b, and the process can be repeated a third time for setting the conductor length 625c in which LED 627a flashes a different color (such as green).

User interface circuitry 621 optionally includes a display 630. Display 630 can display parameters set by the user and/or information about power management equipment. In some embodiments, display 630 can function as an I/O device that also enables the user to set the various user input parameters described above. For example, the user can interact with the display via input 626 or another I/O device to set the voltage target, conductor gauge, conductor length, or other parameter. In some embodiments, display 630 is a touch-screen display to enable direct interfacing with the user by touching the screen. Display 630 can be a liquid crystal display (LCD) or other type of display.

Figure 7:
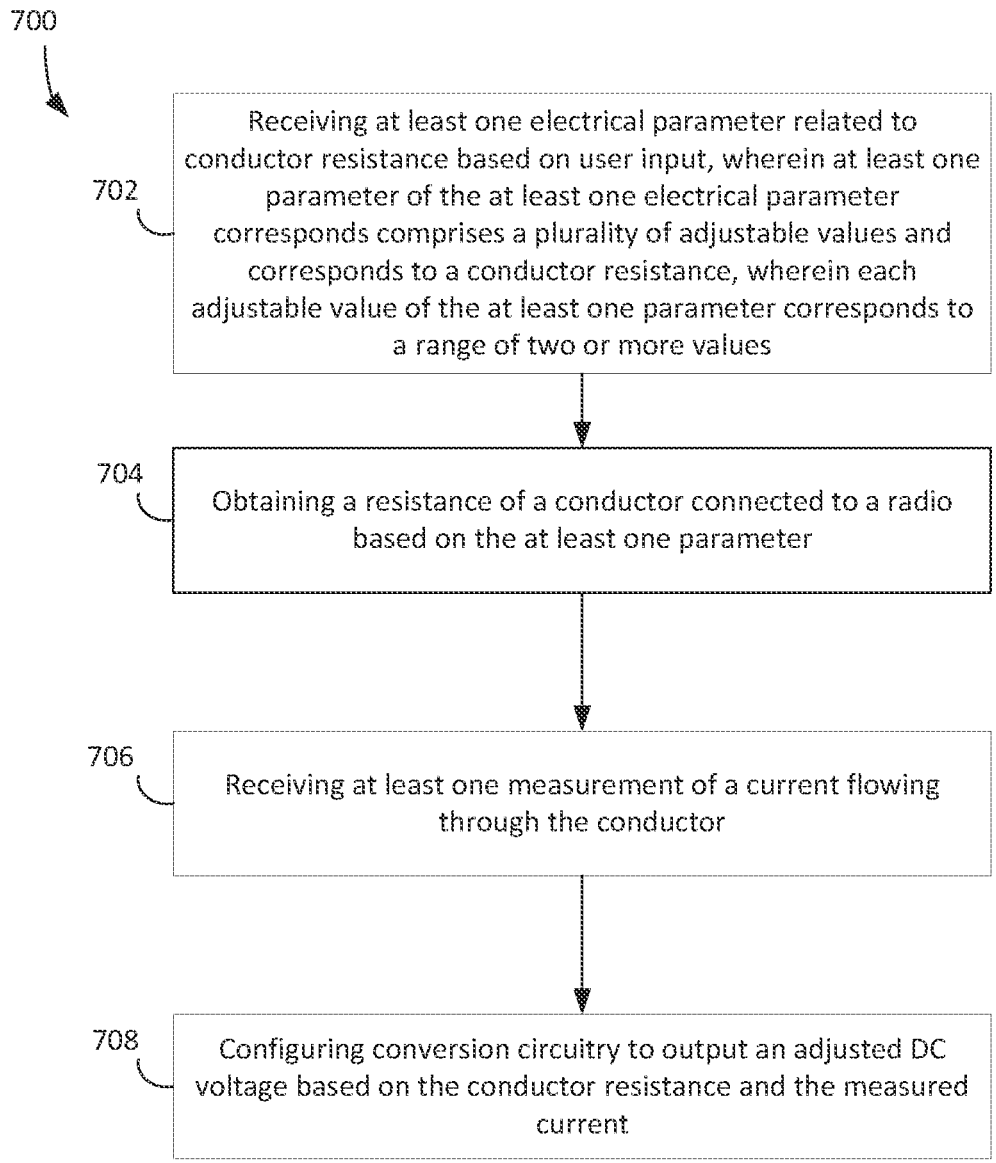
FIG. 7 depicts a flow diagram illustrating one embodiment of a method for adjusting the DC voltage output of conversion circuitry according to the teachings of the present disclosure.

FIG. 7 depicts a flow diagram illustrating one embodiment of a method for adjusting the DC voltage output of conversion circuitry. Method 700 may be implemented via the techniques described with respect to FIGS. 1-6, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 700 begins at block 702 by receiving at least one electrical parameter related to a resistance of the electrical conductors coupling the at least one radio to a voltage conversion module (e.g., dynamic boost converter module, static boost converter module, unboosted module), and is based on user input. At least one electrical parameter corresponds to a conductor resistance, such as a conductor gauge parameter and/or a conductor length parameter. The at least one electrical parameter can also include other parameters relevant to providing DC voltage to a radio remotely coupled to conversion circuitry via a conductor, such as the target voltage provided to the radio. At least one of the electrical parameters is defined by a range of values, which can include, for example, a range of conductor resistance that is received. For example, each adjustable value in the range of the parameter corresponds to two or more quantities.

At block 704 a resistance of the electrical conductors coupled to a radio and to the output of conversion circuitry is obtained based on the at least one parameter, e.g., conductor gauge and/or conductor length. For example, the resistance of the electrical conductors that corresponds to the at least one parameter(s) input by the user can be determined through a look-up table stored in memory.

At block 706 at least one measurement of a current flowing through the electrical conductors is received, e.g., from a current sensor.

At block 708 conversion circuitry is configured to output an adjusted DC voltage based on the conductor resistance and the measured current.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically erasable read-only memory (EEPROM), and flash memory devices; magnetic disks such as internal hard disks and removable disks; magneto-optical disks; and digital video disks (DVDs). Any of the foregoing may be supplemented by, or incorporated in, specially-designed application-specific integrated circuits (ASICs).

Numerical voltage quantities are generically referenced for pedagogical explanation independent of whether the referenced voltage is a positive or negative value. Therefore, any numerical voltage can be implemented as a positive or negative voltage unless expressly indicated otherwise. For example, a voltage of 54 VDC could be implemented as a +54 VDC or also as −54 VDC.

EXAMPLE EMBODIMENTS

Example 1 includes a voltage conversion system, comprising: overcurrent protection circuitry configured to receive a direct current (DC) power signal having a DC voltage and configured to protect the voltage conversion system from a current flowing through the voltage conversion system from exceeding a safe operating level, wherein the overcurrent protection circuitry is configured to provide an input DC voltage based on the received DC voltage; user interface circuitry disposed on the voltage conversion system, wherein the user interface circuitry is configured to input at least one electrical parameter based on user input, wherein at least one parameter of the at least one electrical parameter comprises a plurality of adjustable values and corresponds to a conductor resistance, wherein each adjustable value of the at least one parameter corresponds to a range of two or more values; conversion circuitry coupled to the overcurrent protection circuitry and the user interface circuitry, the conversion circuitry configured to generate an adjusted DC voltage from the input DC voltage based on the at least one electrical parameter; and overvoltage protection circuitry electrically coupled to the conversion circuitry, wherein the overvoltage protection circuitry is configured to provide the adjusted DC voltage to electrical conductors electrically coupled to the voltage conversion system.

Example 2 includes the voltage conversion system of Example 1, further comprising an alternating current-direct current (AC/DC) power supply electrically coupled to the overcurrent protection circuitry, wherein the AC/DC power supply is configured to receive an alternating current (AC) voltage from an AC power source, wherein the AC/DC power supply is configured to generate a DC voltage from the AC voltage and provide the DC voltage to the overcurrent protection circuitry.

Example 3 includes the voltage conversion system of any of Examples 1-2, wherein the voltage conversion system is a contained module that is configured to be mounted in a container.

Example 4 includes the voltage conversion system of any of Examples 1-3, further comprising controller circuitry electrically coupled to the user interface circuitry and the conversion circuitry, wherein the controller circuitry is configured to obtain the conductor resistance based on the at least one parameter and a measured current flowing through the electrical conductors, and wherein the controller circuitry is configured to configure the conversion circuitry based on the conductor resistance.

Example 5 includes the voltage conversion system of Example 4, further comprising memory circuitry electrically coupled to the controller circuitry, wherein the memory circuitry is configured to store a look-up table that includes a list of conductor resistance values corresponding to a respective value of the at least one parameter, and wherein the controller circuitry is configured to access the look-up table to determine the conductor resistance.

Example 6 includes the voltage conversion system of any of Examples 1-5, wherein the at least one electrical parameter comprises at least one of conductor gauge, a conductor length, and a target DC voltage to output to the electrical conductors.

Example 7 includes the voltage conversion system of any of Examples 1-6, wherein the at least one electrical parameter comprises a conductor length and wherein each adjustable value of the conductor length corresponds to a range of at least 50 feet.

Example 8 includes the voltage conversion system of any of Examples 4-7, wherein the user interface circuitry comprises at least one input/output (I/O) device configured to input the at least one electrical parameter to the controller circuitry, wherein the at least one I/O device comprises at least one of: a switch, a dial, a knob, a display, a button, and a potentiometer.

Example 9 includes the voltage conversion system of Example 8, wherein the user interface circuitry comprises at least one light emitting diode (LED), wherein the at least one LED is configured to indicate to a user to input the at least one electrical parameter via the at least one I/O device.

Example 10 includes the voltage conversion system of Example 9, wherein the at least one LED is configured to emit a different color light corresponding to each respective at least one electrical parameter.

Example 11 includes a program product comprising non-transitory computer readable medium having instructions that, when executed by at least one processor, cause the at least one processor to: receive at least one electrical parameter based on user input, wherein at least one parameter of the at least one electrical parameter comprises a plurality of adjustable values and corresponds to a conductor resistance of electrical conductors electrically coupled to a voltage conversion system, wherein each adjustable value of the at least one parameter corresponds to a range of two or more values; obtain the conductor resistance based on the at least one parameter; receive at least one current parameter corresponding to a measured current flowing through the electrical conductors; and configure conversion circuitry of the voltage conversion system electrically coupled to the electrical conductors to output an adjusted direct current (DC) voltage based on the at least one electrical parameter and the at least one current parameter.

Example 12 includes the program product of Example 11, wherein to determine a conductor resistance comprises accessing a look-up table stored in memory circuitry and determining the conductor resistance corresponding to the at least one parameter based on data in the look-up table.

Example 13 includes the program product of any of Examples 11-12, wherein the at least one electrical parameter comprises at least one of conductor gauge, a conductor length, and a target DC voltage.

Example 14 includes the program product of any of Examples 11-13, wherein receiving the at least one electrical parameter comprises receiving a signal corresponding to the at least one electrical parameter from an input/output (I/O) device of user interface circuitry disposed on the voltage conversion system.

Example 15 includes the program product of any of Examples 11-14, wherein the instructions are configured to further cause the at least one processor to configure the conversion circuitry to output an adjusted DC voltage based on a minimum operating voltage of a radio electrically coupled to the electrical conductors.

Example 16 includes the program product of any of Examples 11-15, wherein the instructions are configured to further cause the at least one processor to output an adjusted DC voltage based on: $y=mx+b$ where y is the adjusted DC voltage, m is a resistance value corresponding to the at least one parameter, x is the measured current, and b is a voltage corresponding to an operating voltage of a radio electrically coupled to the electrical conductors.

Example 17 includes the program product of any of Examples 11-16, wherein the at least one parameter comprises a conductor length, and wherein to determine the conductor resistance based on the at least one parameter comprises determining the conductor resistance based on the conductor length and at least one additional parameter.

Example 18 includes a method of determining an output direct current (DC) voltage of a voltage conversion system electrically coupled to electrical conductors, comprising: receiving at least one electrical parameter based on user input, wherein at least one parameter of the at least one electrical parameter comprises a plurality of adjustable values and corresponds to a conductor resistance of the electrical conductors electrically coupled to the voltage conversion system, wherein each adjustable value of the at least one parameter corresponds to a range of two or more values; obtaining the conductor resistance based on the at least one parameter; receiving at least one current parameter corresponding to a measured current flowing through the electrical conductors; and configuring conversion circuitry of the voltage conversion system electrically coupled to the electrical conductors to output an adjusted direct current (DC) voltage based on the at least one electrical parameter and the at least one current parameter.

Example 19 includes the method of Example 18, wherein obtaining the conductor resistance comprises accessing a look-up table and determining the conductor resistance corresponding to the at least one parameter based on data in the look-up table.

Example 20 includes the method of any of Examples 18-19, wherein the at least one electrical parameter comprises at least one of conductor gauge, a conductor length, and a target DC voltage.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A voltage conversion system, comprising:
    overcurrent protection circuitry configured to receive a direct current (DC) power signal having a DC voltage and configured to protect the voltage conversion system from a current flowing through the voltage conversion system from exceeding a safe operating level, wherein the overcurrent protection circuitry is configured to provide an input DC voltage based on the DC voltage;
    user interface circuitry disposed on the voltage conversion system, wherein the user interface circuitry is configured to input at least one electrical parameter based on user input, wherein at least one parameter of the at least one electrical parameter comprises a plurality of adjustable values and corresponds to a conductor resistance, wherein each adjustable value of the at least one parameter corresponds to a range of two or more values;
    conversion circuitry coupled to the overcurrent protection circuitry and the user interface circuitry, the conversion circuitry configured to generate an adjusted DC voltage from the input DC voltage based on the at least one electrical parameter; and
    overvoltage protection circuitry electrically coupled to the conversion circuitry, wherein the overvoltage protection circuitry is configured to provide the adjusted DC voltage to electrical conductors electrically coupled to the voltage conversion system.

2. The voltage conversion system of claim 1, further comprising an alternating current-direct current (AC/DC) power supply electrically coupled to the overcurrent protection circuitry, wherein the AC/DC power supply is configured to receive an alternating current (AC) voltage from an AC power source, wherein the AC/DC power supply is configured to generate the DC voltage from the AC voltage and provide the DC voltage to the overcurrent protection circuitry.

3. The voltage conversion system of claim 1, wherein the voltage conversion system is a contained module that is configured to be mounted in a container.

4. The voltage conversion system of claim 1, further comprising controller circuitry electrically coupled to the user interface circuitry and the conversion circuitry, wherein the controller circuitry is configured to obtain the conductor resistance based on the at least one parameter and a measured current flowing through the electrical conductors, and wherein the controller circuitry is configured to configure the conversion circuitry based on the conductor resistance.

5. The voltage conversion system of claim 4, further comprising memory circuitry electrically coupled to the controller circuitry, wherein the memory circuitry is configured to store a look-up table that includes a list of conductor resistance values corresponding to a respective value of the at least one parameter, and wherein the controller circuitry is configured to access the look-up table to determine the conductor resistance.

6. The voltage conversion system of claim 4, wherein the user interface circuitry comprises at least one input/output (I/O) device configured to input the at least one electrical parameter to the controller circuitry, wherein the at least one I/O device comprises at least one of: a switch, a dial, a knob, a display, a button, and a potentiometer.

7. The voltage conversion system of claim 6, wherein the user interface circuitry comprises at least one light emitting diode (LED), wherein the at least one LED is configured to indicate to a user to input the at least one electrical parameter via the at least one I/O device.

8. The voltage conversion system of claim 7, wherein the at least one LED is configured to emit a different color light corresponding to each respective at least one electrical parameter.

9. The voltage conversion system of claim 1, wherein the at least one electrical parameter comprises at least one of conductor gauge, a conductor length, and a target DC voltage to output to the electrical conductors.

10. The voltage conversion system of claim 1, wherein the at least one electrical parameter comprises a conductor length and wherein each adjustable value of the conductor length corresponds to a range of at least 50 feet.

11. A program product comprising non-transitory computer readable medium having instructions that, when executed by at least one processor, cause the at least one processor to:
receive at least one electrical parameter based on user input, wherein at least one parameter of the at least one electrical parameter comprises a plurality of adjustable values and corresponds to a conductor resistance of electrical conductors electrically coupled to a voltage conversion system, wherein each adjustable value of the at least one parameter corresponds to a range of two or more values;
obtain the conductor resistance based on the at least one parameter;
receive at least one current parameter corresponding to a measured current flowing through the electrical conductors; and
configure conversion circuitry of the voltage conversion system electrically coupled to the electrical conductors to output an adjusted direct current (DC) voltage based on the at least one electrical parameter and the at least one current parameter.

12. The program product of claim 11, wherein to determine the conductor resistance comprises accessing a look-up table stored in memory circuitry and determining the conductor resistance corresponding to the at least one parameter based on data in the look-up table.

13. The program product of claim 11, wherein the at least one electrical parameter comprises at least one of conductor gauge, a conductor length, and a target DC voltage.

14. The program product of claim 11, wherein receiving the at least one electrical parameter comprises receiving a signal corresponding to the at least one electrical parameter from an input/output (I/O) device of user interface circuitry disposed on the voltage conversion system.

15. The program product of claim 11, wherein the instructions are configured to further cause the at least one processor to configure the conversion circuitry to output an adjusted DC voltage based on a minimum operating voltage of a radio electrically coupled to the electrical conductors.

16. The program product of claim 11, wherein the instructions are configured to further cause the at least one processor to output an adjusted DC voltage based on:

$$y=mx+b,$$

where y is the adjusted DC voltage, m is a resistance value corresponding to the at least one parameter, x is the measured current, and b is a voltage corresponding to an operating voltage of a radio electrically coupled to the electrical conductors.

17. The program product of claim 11, wherein the at least one parameter comprises a conductor length, and wherein to determine the conductor resistance based on the at least one parameter comprises determining the conductor resistance based on the conductor length and at least one additional parameter.

18. A method of determining an output direct current (DC) voltage of a voltage conversion system electrically coupled to electrical conductors, comprising:
receiving at least one electrical parameter based on user input, wherein at least one parameter of the at least one electrical parameter comprises a plurality of adjustable values and corresponds to a conductor resistance of the electrical conductors electrically coupled to the voltage conversion system, wherein each adjustable value of the at least one parameter corresponds to a range of two or more values;
obtaining the conductor resistance based on the at least one parameter;
receiving at least one current parameter corresponding to a measured current flowing through the electrical conductors; and
configuring conversion circuitry of the voltage conversion system electrically coupled to the electrical conductors to output an adjusted direct current (DC) voltage based on the at least one electrical parameter and the at least one current parameter.

19. The method of claim 18, wherein obtaining the conductor resistance comprises accessing a look-up table and determining the conductor resistance corresponding to the at least one parameter based on data in the look-up table.

20. The method of claim 18, wherein the at least one electrical parameter comprises at least one of conductor gauge, a conductor length, and a target DC voltage.

* * * * *